UNITED STATES PATENT OFFICE.

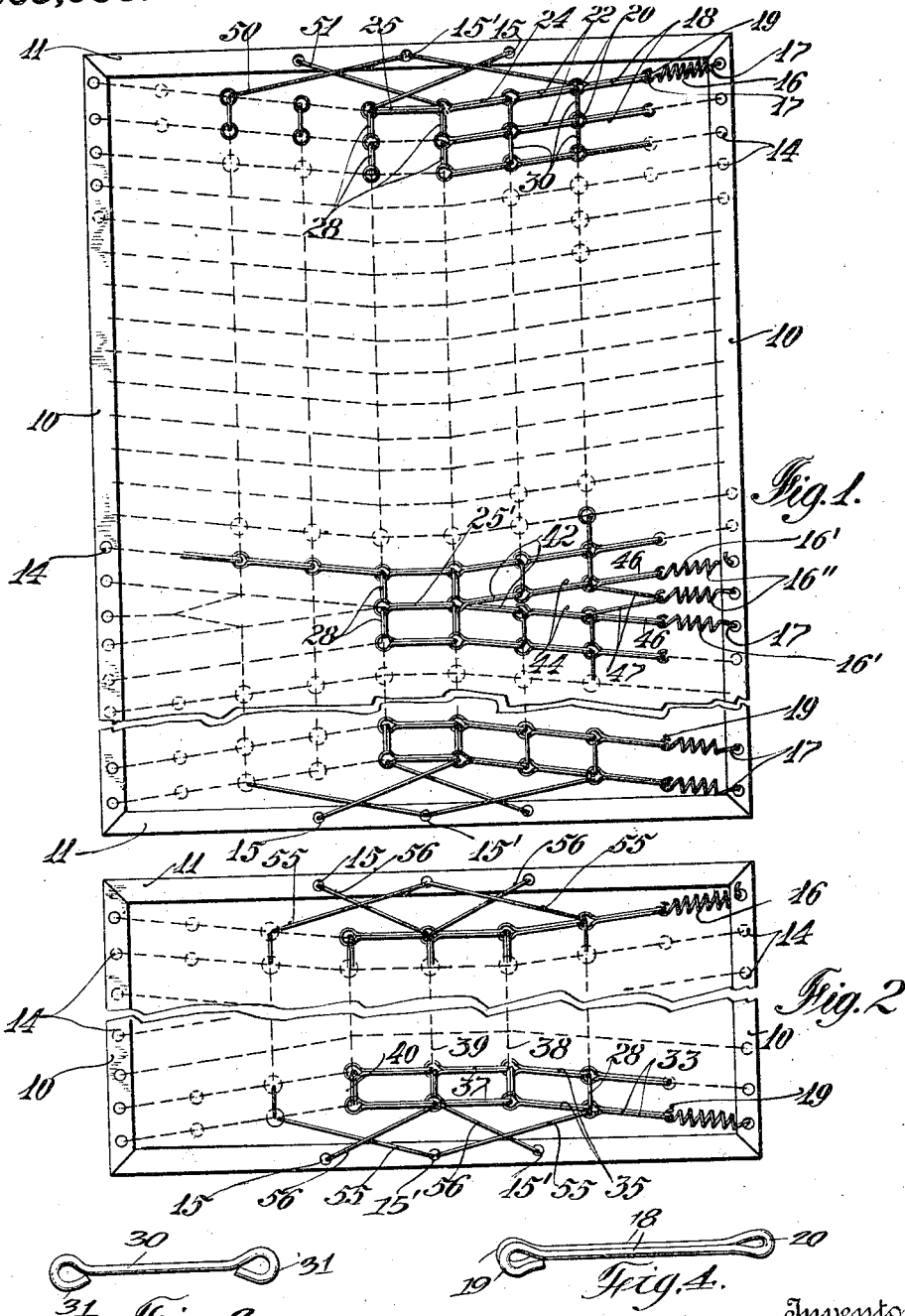

JOHN B. ANDRES, OF BALLSTON SPA, NEW YORK.

FABRIC FOR SPRING-BEDS.

1,305,986.　　　　　　　Specification of Letters Patent.　　Patented June 10, 1919.

Application filed August 17, 1918.　Serial No. 250,308.

*To all whom it may concern:*

Be it known that I, JOHN B. ANDRES, a citizen of the United States, residing in Ballston Spa, in the county of Saratoga and State of New York, have invented certain new and useful Improvements in Fabrics for Spring-Beds, of which the following is a specification.

This invention relates to improvements in bed springs and has as its main object the production of a fabric for spring beds and the like, whereby an unusual degree of comfort is obtained, sagging prevented, and longevity of parts assured.

This and other objects, such as simplicity of parts, cheapness of construction, lightness combined with strength, and non-liability of disorganization, are attained by the novel construction and arrangement of parts hereinafter described and shown in the accompanying drawing, forming a material part of this disclosure, and in which—

Figure 1 is a partial top plan view of a bed spring made in accordance with the invention, Fig. 2 is a similar fragmentary view showing a slight modification in construction, Figs. 3 and 4 are detail views showing the construction of the link elements.

In the drawings, the numeral 10 designates the side frame elements, arranged parallel and secured at their ends to the end frame elements 11, forming a substantially rigid, rectangular structure of any size compatible with the bed or other article in which it will be used.

The frame elements here shown are made of rolled steel angles presenting a flat, flanged upper surface and straight vertical walls, the several elements being firmly joined at the corners by any common means known in the trade.

Formed through the normally horizontal flanges of the side elements 10 are a plurality of equally spaced openings 14, while in the corresponding flanges of the end elements 11 are a group of wider spaced openings 15 and 15′, the foregoing construction of frame parts being merely illustrative of a conventional type adapted to support the spring fabric.

The invention comprises a plurality of helically coiled tension springs 16, formed with hook eyes 17, engaged at one end within the openings 14, or other suitable securing means, their opposite ends being connected with links 18 formed by wires presenting hooks 19 at one end and eyes 20 at the other, in which are engaged other links 22, in turn engaged by central links 25, connected in a similar manner by links attached to the other frame element, both sides of the bed spring being alike, as is the construction of the link elements.

Engaged between each of the eyes, formed at the ends of the central transverse links 25, are relatively short, longitudinally disposed, double wire links 28, while between the ends of the side links 18, 22 and ends of the transverse links 24 are single wire links 30, the links having hooks 31 at their ends.

In the modifications shown in Fig. 2 a different link arrangement is shown, consisting of three transverse links upon each side, respectively 33, 35 and 37, and also three double longitudinal links 38, 39 and 40 which extend when connected, substantially the full length of the bed, as do the corresponding single elements 28.

At about the middle of the length of the bed spring the connecting link 25′ is engaged at both ends with pairs of diverging links 42, connected with diagonally disposed links 44, in turn engaged with outer, diagonal links 46 joined to the side frame elements by springs 16′ the last pair of links having between them a pair of converging links 47 engaged by single springs 16″ direct to the frame sides.

This construction forms a gusset which causes all of the series of transverse links to assume diagonal positions relative to the side frame, slanting toward the center, the links being held practically taut by the end connections consisting of diagonally disposed stress rods 50 and 51, the former being secured in the center opening 15′ of the three openings 15 and 15′ and extending to the loops 20, while the rods 51 are attached in the outermost of the openings 15, crossing each other and engaged at the ends of the center, outer links 25.

In the modified form the links 55 extend from the center opening 15′ to the eyes between the links 33 and 35, while the rods 56 extend from the outer openings 15 in the end frame elements to the central longitudinal row of links 39.

From the foregoing it will be seen that a novel and peculiar disposition of springs, links and rods has been disclosed, adapted to prevent sagging and that the cross elements, due to the side gussets, are disposed diagonally to the frame sides and stayed at the ends of the frame in such manner that all points on the bed spring are alike resilient, the construction being stiffened, in a manner at the center, by the double rib-like longitudinally extending elements.

The foregoing description and accompanying drawings is to be regarded as illustrative rather than restrictive, of the bed spring fabric and without reference to any specific form of support frame, as obviously modifications can be made without departing from the claims.

Having thus described my invention and set forth the manner of its constructions and use, what I claim as new and desire to secure by Letters Patent, is—

1. In a bed spring fabric, the combination with a plurality of wire links disposed in longitudinal rows, two or more of the rows adjacent to the center being doubled, and a plurality of wire links arranged in transverse rows, connecting between the ends of said longitudinal links, of gussets extending inwardly at the center between said transverse rows from each side, stress rods engaging the end rows of said transversely disposed links, and springs fixed at their outer ends and engaged at the opposite ends of each transverse row of links and with the outer elements of said gussets.

2. In a bed spring fabric, the combination with a rigid support, of a plurality of interengaged transverse links arranged in rows therein, tension springs engaging the sides of the said support and the outermost of said links, triangular gussets at the middle of said fabric, tension springs between the bases of said gussets and said support, connecting elements extending longitudinally between the links of each transverse row, and rods secured in the ends of said support at one end and with the end rows of said transverse links, said rods extending angularly and adapted to stress the structure formed by the engaged links, springs and gussets in the direction of the length of the spring fabric.

3. In a bed spring fabric, the combination with a frame and a plurality of helically coiled tension springs extending diagonally toward the longitudinal median line of the fabric, two or more longitudinally extending series of links at the middle part thereof, said links being composed of double strands of wire, a plurality of transverse links connecting between opposed pairs of said springs, said transverse links being engaged with said longitudinal links at the ends thereof, and rods at the ends of said frame angularly extended and engaged with the extreme outer row of said transverse links at the ends of the fabric.

4. In a bed spring fabric, the combination with a rigid rectangular support frame having side and end elements, a plurality of helical tension springs fixed at one end in said side elements, a pair of opposed triangular gussets comprised of links, the apex of said gussets extending toward the longitudinal median line of said frame their bases being engaged by certain of said springs, a plurality of interengaged wire links forming a coarse net, transverse and longitudinal links, the transverse rows of said links being engaged at their outer extremities with others of said springs, pairs of rods secured centrally of said end elements, said rods being angularly extended and engaged with the respective end rows of said transverse links, and a second pair of rods secured in said end elements at points equally remote from the first named rods, said second rods being convergingly disposed and attached to the end rows of said transverse links at the center thereof.

In testimony whereof, I have signed my name to this specification.

JOHN B. ANDRES.

Copies of this patent may be obtained for five cents each, by addressing the "Commissioner of Patents, Washington, D. C."